United States Patent Office 3,505,137
Patented Apr. 7, 1970

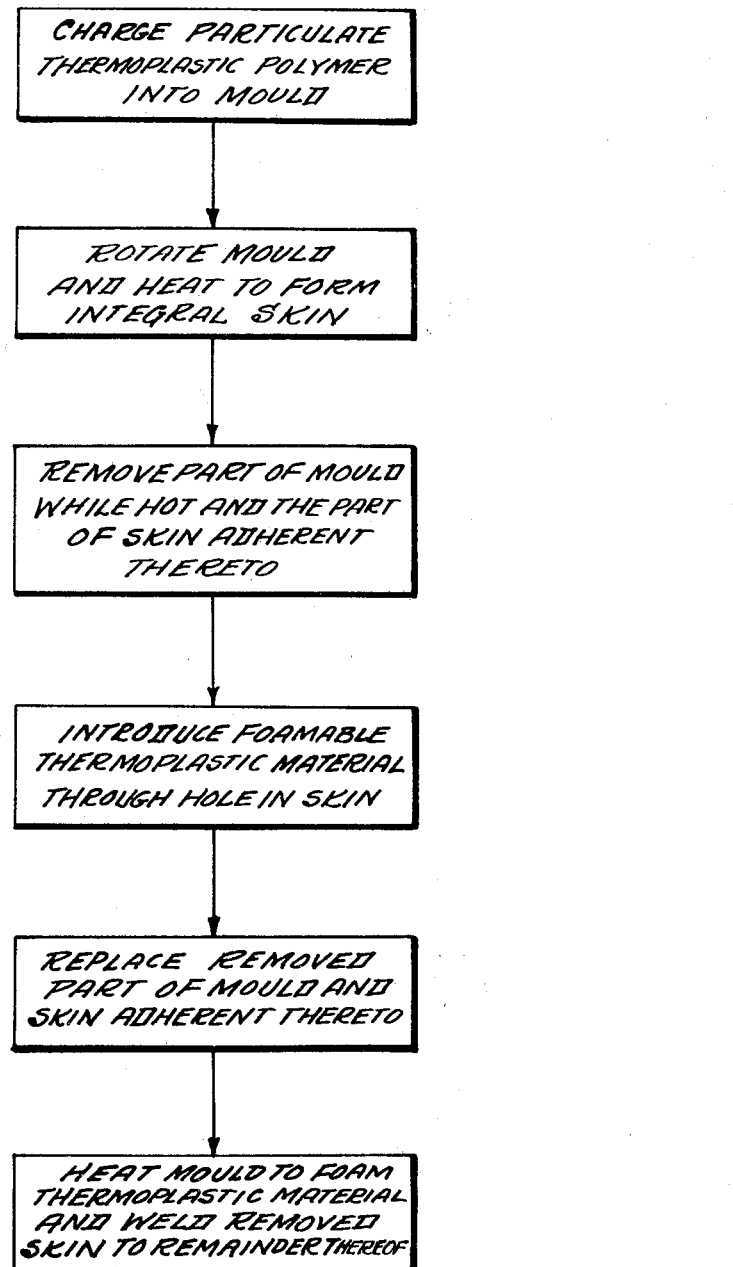

3,505,137
PROCESS FOR PRODUCING HOLLOW BODIES
REINFORCED WITH A FOAMED STRUCTURE
Ronald Ian Kliene, Welwyn Garden City, England, assignor to Imperial Chemical Industries Limited, London, England, a corporation of Great Britain
Filed Sept. 2, 1966, Ser. No. 576,859
Claims priority, application Great Britain, Sept. 13, 1965, 38,989/65
Int. Cl. B29d 9/00, 27/00
U.S. Cl. 156—78                                12 Claims

ABSTRACT OF THE DISCLOSURE

Hollow bodies having a reinforced foam structure within the hollow body are formed by introducing a thermoplastic composition into a mould which is rotated to distribute the thermoplastic composition throughout the mould and then heated to form an integral skin of the thermoplastic composition and while still hot a part of the mould's surface and the part of the thermoplastic composition adherent to that part of the mould are removed to form a hole and thermoplastic material containing a thermally decomposable blowing agent introduced through the said hole in the skin of the thermoplastic composition, and that part of the mould and skin replaced and the mould heated to decompose the blowing agent and cause the thermoplastic material to foam and simultaneously to weld that part of the skin, which was removed, to the body of the thermoplastic composition.

---

The present invention relates to a process for the production of hollow bodies reinforced with a foamed structure. It relates particularly to a process for producing such articles which are required to withstand high external pressures or severe impact.

In order that a hollow body will not collapse when subjected to high pressures it is necessary that either the walls of the body be of a great thickness, or be made of very strong material, or the interior of the body is provided with a reinforcing material.

One method of reinforcing a hollow body is to form a foamed core within the hollow body. A method for the manufacture of smooth skinned articles having a foamed core consists of filling a closed mould with a plastic composition containing a blowing agent and subjecting it to heat. Expansion of the composition is prevented by the application of high mould clamping pressures. Subsequently on release of the pressure and application of further heat expansion takes place and by careful control of the temperature of the mould a skin is formed around the structure. However, the skin so formed is generally thin and will tend to collapse when subjected to high pressures. This leads to the collapse of the thin membranes of the disconnected cells and the moulding is crushed. With connected cell structures the collapse of the skin will lead to the further disadvantage of the foamed core becoming waterlogged when the article is immersed in water.

It has also been proposed to introduce a foamable composition such as a thermoplastic composition containing a blowing agent or a polyurethane foamable resin into a hollow body through a hole in the surface of the hollow body, and then causing the foamable composition to foam. The hole is subsequently sealed by heat or by use of a plug and a suitable adhesive. This leads to weakness in the surface of the body at the position where the hole was made and may lead to collapse of the structure at this point when subjected to high pressure.

According to the present invention we provide a process for the production of hollow bodies reinforced with a foamed structure within the hollow body in which a thermoplastic composition in paste or powdered form is introduced into a mould which may be rotated to distribute the thermoplastic composition throughout the mould and is heated to form an integral skin of the thermoplastic composition and while still hot a part of the mould surface and the part of the integral skin adherent to that part of the mould are removed and a thermoplastic material containing a blowing agent introduced through the hole in the skin of thermoplastic composition, that part of the mould and skin replaced and the mould heated to decompose the blowing agent and cause the thermoplastic material to foam and simultaneously to weld that part of the skin which was removed to the body of the thermoplastic composition.

In operating our process it is essential that when the part of the mould is removed, it is at an elevated temperature sufficient to cause the thermoplastic composition to adhere to the mould surface, and that substantially only that element of the thermoplastic composition in contact with the part of the mould which is removed with that part of the mould. Generally the temperature required will be above the melting point of the thermoplastic composition. Further, the quantity of the compound containing the blowing agent that is introduced into the cavity of the hollow body is such that it does not fill the cavity completely in order to allow the desired degree of expansion to take place. When the thermoplastic material consists of a powdered plastic composition the cavity can be virtually filled as the air spaces between the powder particles usually provide sufficient room for expansion. In this case the bulk density of the powder or granular material will have a bearing on the degree of expansion achieved.

Examples of thermoplastic compositions that may be used to produce the outer skin include polymers and copolymers of olefinic compounds such as ethylene and propylene. If a rigid article is required we prefer to use polyethylene or polypropylene or an ethylene/propylene copolymer. A more flexible article may be obtained by using copolymers of ethylene or propylene with vinyl esters such as vinyl acetate; alkyl esters of unsaturated mono- or dicarboxylic acids such as acrylic acid, methacrylic acid, maleic acid and fumaric acid, in particular the methyl and ethyl esters of such acids; acrylonitrile; methacrylonitrile and maleic acid. Polyacetals and the rigid copolymers based on butadiene, acrylonitrile and styrene may also be used. We prefer that the copolymers contain less than 50% by weight of the copolymer of the copolymerisable monomer.

The hollow body is made in a mould, preferably by introducing the polymer composition optionally containing other additives such as lubricants, heat and light stabilisers and pigments in the form of a powder or a paste into the mould which is then heated and may be rotated preferably about two virtually perpendicular axes to bring the thermoplastic composition into contact with all parts of the hot surface of the mould. The mould may be heated by any of the well known techniques such as radio frequency heating or placing the mould in an oven. The required temperature of the mould will depend upon the nature of the thermoplastic composition that is to be used to form the outer skin of the article.

The foamable material of our invention comprises a thermoplastic material in paste, or particulate, i.e. powdered or granular form containing a blowing agent. By a "blowing agent" we mean a compound which decomposes on heating giving off a gas which is inert to the polymeric composition which is to be foamed, for example azo compounds such as azodicarbonamide and p,p'-oxybisbenzenesulphonylhydrazide, which liberate nitrogen on heating. Other suitable blowing agents are organic liquids which are soluble in the thermoplastic material and have boiling points below 60° C. at atmospheric pressure. Examples of these are methyl chloride, ethyl chloride, methylene chloride, vinyl chloride or dimethyl ether. These liquid blowing agents when incorporated into the thermoplastic material will vapourise on heating and cause the polymeric composition to expand to yield a porous product.

The required thermoplastic materials for the foamable compositions of our invention again depend upon the rigidity required of the finished article and include polymers and copolymers of olefinic compounds. There again for rigid structures we prefer to use polyethylene, polypropylene or an ethylene/propylene copolymer and for flexible structures copolymers of ethylene and propylene with vinyl esters such as vinyl acetate; alkyl esters of unsaturated mono- or dicarboxylic acids such as acrylic acid, methacrylic acid, maleic acid and fumaric acid, in particular the methyl and ethyl esters of such acids. Polymers and copolymers of vinyl chloride with other monomers of the type mentioned above are also suitable for use as the thermoplastic material in the foamable composition used in the process of this invention.

The process of our invention is particularly useful in the manufacture of articles which are able to withstand high external pressures such as articles which may be used to a great depth of water, such as fishing floats. The process of our invention also provides a method for producing cellular walled articles which have an unbroken inner and outer skin which may be used as containers such as drinking cups and flasks. The process may also be used to produce cellular walled containers having an unbroken outer and inner skin to the walls.

By using flexible polymers for the wall and/or cellular core, it is possible to obtain tough, but relatively flexible walls. Suitable polymers for this purpose include ethylene/vinyl acetate, or ethylene/ethyl acrylate copolymers.

The present process is illustrated by the accompanying drawing.

EXAMPLES

Fishing floats of various shapes were produced in aluminium moulds having a centre-line split, in the following manner:

The mould was filled with a polythene powder, ground so that 95% of the particles passed a 52 mesh (300μ) sieve. The mould with its charge of powder was rotated in two axes in an oven held at a temperature of 650° F. for several minutes. The rotation was then stopped and, while the mould was still hot, a one inch diameter plug on one half of the mould was removed together with the layer of molten polythene adhering to its inner surface. The hollow moulding was then filled with a second charge of polythene or polypropylene powder which had previously been blended with a chemical blowing agent. The plug was then replaced in its seating and rotation in the oven at 650° to 700° F. continued for a second period lasting several minutes. During this time the molten polythene layer on the inner surface of the plug was firmly welded back in place to form a continuous outer skin. Simultaneously the second charge of powder containing the chemical blowing agent was expanded to form a cellular core.

The mould was cooled by water sprays and air blowers and then opened to remove the moulding. When the mouldings were cut open the outer skin was found to completely enclose the foamed core. In some cases the entire inner cavity of the moulding was filled with the cellular polymer which was firmly welded to the outer skin. In other cases a layer of cellular polymer ¼ inch to ½ inch thick was formed as a reinforcement to the unblown outer skin. The quantity of the second charge of powder and blowing agent blend, the degree of expansion and the geometry of the shape being moulded determined which of these alternatives was achieved.

The following are typical examples of floats produced in this way:

| | EXAMPLE 1 | EXAMPLE 2 | EXAMPLE 3 | EXAMPLE 4 |
|---|---|---|---|---|
| | 5¾ Inch Diameter Spherical Float | 7½ Inch Diameter Toroid Ring Float | 7½ Inch Diameter Toroid Ring Float | 7½ Inch Diameter Ring Composed of 6x2½ Inch Spheres |
| (I) Outer skin—Polymer | Polythene: Melt index 8, density 0.926. | Polythene: Melt index 8, density 0.926. | Polythene: Melt index 8, density 0.926. | Polythene: Melt index 8, density 0.926. |
| Approximate thickness | ⅛ inch | .532 inch | ⅛ inch | ⅛ inch. |
| Weight of charge | 200 g | 250 g | 200 g | 200 g. |
| Oven temperature | 650° F | 650° F | 650° F | 650° F. |
| Heating time | 11 mins | 12 mins | 11 mins | 11 mins. |
| (II) Cellular Core | High density polythene: Melt index 3, density 0.96. | Ethylene/propylene copolymer. | Polypropylene | High density polythene: Melt index 3 density 0.926. |
| Approximate density of foamed core. | 0.30 g./cc | 0.35 g./cc | 0.30 g./cc | 0.30 g./cc. |
| Weight of charge | 300 g | 225 g | 200 g | 200 g. |
| Blowing agent and concentration. | 1% p,p'-oxybisbenzene-sulphonylhydrazide. | 2% azodicarbonamide | 2% azodicarbonamide | 2% p,p'-oxybisbenzene-sulphonylhydrazide. |
| Oven temperature | 650° F | 700° F | 700° F | 650° F. |
| Heating time | 16 mins | 18 mins | 15 mins | 12 mins. |
| Pressure test (Collapse pressure). | 580 p.s.i | 920 p.s.i | 860 p.s.i | 780 p.s.i |

I claim:

1. A process for the production of hollow bodies reinformed with a foamed structure within the hollow body in which a particulate thermoplastic polymer is introduced into a mould which is rotated to distribute the thermoplastic polymer throughout the mould and is heated to form an integral skin of the thermoplastic polymer and while still hot a part of the mould surface and the part of the thermoplastic polymer adherent to that part of the mould are removed to form a hole and a thermoplastic material containing a thermally decomposable blowing agent introduced through said hole in the skin of the thermoplastic polymer, that part of the mould and skin replaced and the mould heated to decompose the blowing agent and cause the thermoplastic material to foam and simultaneously to weld that part of the skin which was removed to the body of the thermoplastic polymer.

2. A process according to claim 1 in which the particulate thermoplastic material containing the blowing agent is in particulate form.

3. A process according to claim 1 in which the thermoplastic material containing the blowing agent is in paste form.

4. A process according to claim 1 in which the thermoplastic polymer is a polymer of an olefinic compound.

5. A process according to claim 1 in which the particulate thermoplastic polymer is a copolymer of an olefinic compound.

6. A process according to claim 1 in which the blowing agent is a compound which on heating decomposes to give off a gas which is inert to the polymer.

7. A process according to claim 1 in which the blowing agent is an organic liquid which is soluble in the thermoplastic material and has a boiling point below 60° C. at atmospheric pressure.

8. A process according to claim 1 in which the thermoplastic material for the foamable composition is a polymer of an olefinic compound.

9. A process according to claim 1 in which the thermoplastic material for the foamable composition is a copolymer of an olefinic compound.

10. A process according to claim 8 in which the thermoplastic material is polyethylene.

11. A process according to claim 8 in which the thermoplastic material is polypropylene.

12. A process according to claim 1 in which the thermoplastic material for the foamable composition is a vinyl chloride polymer.

References Cited

UNITED STATES PATENTS

| | | | |
|---|---|---|---|
| 2,278,551 | 4/1942 | Martin | 156—293 XR |
| 2,772,719 | 12/1956 | Wills | 156—293 XR |
| 2,950,505 | 8/1960 | Frank | 264—45 |
| 2,958,907 | 11/1960 | Mumford et al. | 264—45 |
| 3,132,417 | 5/1964 | Irwin | 264—45 XR |
| 3,192,294 | 6/1965 | Streed et al. | 264—126 XR |
| 3,368,013 | 2/1968 | Pisciotta et al. | 264—126 XR |
| 3,391,823 | 7/1968 | Tijms | 264—45 XR |

FOREIGN PATENTS

| | | |
|---|---|---|
| 627,525 | 5/1963 | Belgium. |
| 1,127,068 | 4/1962 | Germany. |

PHILIP E. ANDERSON, Primary Examiner

U.S. Cl. X.R.

156—293; 161—160; 264—36, 45, 126